June 12, 1923.

M. S. CLAWSON

WELDING PROCESS

Filed April 23, 1920

1,458,274

Witness:
John M. Jester

Inventor
Monroe S. Clawson
By D. A. Gourick
Attorney

Patented June 12, 1923.

1,458,274

UNITED STATES PATENT OFFICE.

MONROE S. CLAWSON, OF UPPER MONTCLAIR, NEW JERSEY.

WELDING PROCESS.

Application filed April 23, 1920. Serial No. 376,069.

*To all whom it may concern:*

Be it known that I, MONROE S. CLAWSON, a citizen of the United States, residing at Upper Montclair, in the county of Essex and State of New Jersey, have invented new and useful Improvements in Welding Processes, of which the following is a specification.

This invention relates to the metal working art, particularly to welding, and has for its object the provision of a welding process which involves the passage of a welding current through the joint between two pieces of metal, the essential feature being the use of a resistance member between each contact and the pieces to be welded in contra-distinction to the well known butt welding process in which the electrical contacts directly engage the pieces of metal, it being observable that in my process the heat is generated by the passage of current through the resistance members.

An important object is the provision of a process of this character in which the parts to be welded are held in a horizontal position so that the welding material which is interposed between the two pieces to be welded cannot run out by gravity.

A distinctive object is the use in a process of this character of an indicator which has one terminal connected with one of the pieces to be welded and its other terminal connected to a prolongation or extension of the strip of welding material, the piece of metal and the welding strip constituting a thermo-couple by which a current will be set up when these contacting metals are subjected to heat. It is well known that in making a weld there is danger of carrying the temperature too high or of removing the pieces before the weld is completed, and it is the purpose of the utilization of this thermo-couple to obviate this contingency as an indicator will apprise the operator or attendant of the exact time at which the weld is made. The use of the indicator is important as it would not suffice to depend upon the breaking off of the extension of the welding strip to determine when the weld is completed as by the time that the welding strip might break or drop, the pieces being welded might fuse.

Figure 1:
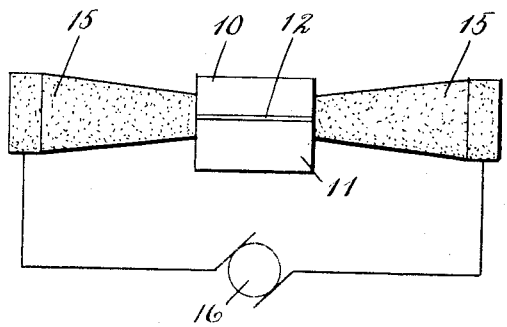
Figure 2:
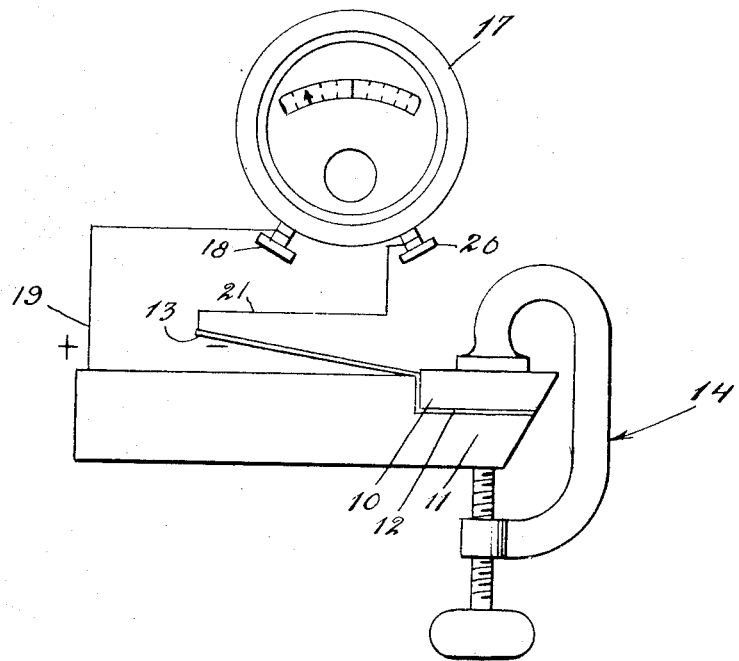

It is of course to be understood that various means might be provided for carrying out this process, though for the sake of illustration I have shown means in the accompanying drawings in which Figure 1 is a diagrammatic illustration of the process, and Fig. 2 is a view showing the use of the indicator.

Referring more particularly to the drawings, the numerals 10 and 11 designate two pieces of metal to be welded, and 12 designates the welding strip disposed between them. This strip is relatively long to provide a projecting portion 13 which is spaced from the piece of metal 10. The pieces 10 and 11 and the strip between them must be secured together while the weld is being made and for the sake of illustration I have shown a screw clamp 14 for this purpose.

Engaging the pieces to be welded are resistance members 15 which of course must be pressed firmly against the pieces to be welded by any suitable means. These resistance members 15 may be formed of carbon or graphite and are connected with a conventional source of current 16. When the current is passed through the resistance members it is obvious that its passage will generate heat which will be communicated to the pieces to be welded and when the temperature of these pieces reaches the proper point the weld will be accomplished.

In order that the current may be cut off at the proper time, use may be made of an indicator of conventional type illustrated at 17, and this indicator has one terminal 18 connected by a wire 19 with the piece of metal 10 and has its other terminal 20 connected by a wire 21 with the extension 13 of the welding strip, which may be of any suitable or preferred alloy. The metal piece 10 and the welding strip extension 13 constitute the positive and negative members, respectively, of the thermo-couple. As the contacting portions of these dissimilar metals are heated, that is at the joint to be welded, a current will be set up in the thermo-electrical circuit proportionate to the degree of heat. When the indicator indicates a certain degree of current, which would probably have to be predetermined by experimentation, the operator will be apprised of the fact that the weld is completed. It will be observed that owing to the fact that the pieces of metal are so arranged that the joint between them is in horizontal position, the welding material cannot run out by gravity.

From the foregoing description and a study of the drawings it will be apparent that I have thus provided a welding process in which the welding heat is conducted to the pieces to be welded, through resistance members in which the heat is generated by the passage of a current therethrough instead of the current being applied directly to the pieces to be welded and the heat being generated between them. It will also be noted that by the use of an indicator and the utilization of a thermo-electric circuit set up during the application of heat, that the instant of completion of the weld may be determined to avoid burning or fusing the metals.

Having thus described my invention, I claim:

1. A process for welding pieces of metal having an alloy strip disposed therebetween consisting in passing an electric circuit through the joint and utilizing the thermo-electric current set up between the alloy and one of the pieces of metal when the same become heated for determining the point at which welding occurs.

2. A process for welding two pieces of metal having an alloy strip disposed therebetween and projecting beyond the joint, consisting in disposing resistance members against opposite sides of the joint, passing an electric current through said resistance members and consequently through the joint, and the utilization of the thermo-electric current set up in the thermo-couple formed by the alloy strip and one of the pieces of metal for the operation of an indicator for determining the point at which welding occurs.

In testimony whereof I hereto affix my signature.

MONROE S. CLAWSON.